(12) United States Patent
Hahn et al.

(10) Patent No.: US 9,237,512 B2
(45) Date of Patent: Jan. 12, 2016

(54) METHOD AND APPARATUS FOR SELECTING CARRIER IN WIRELESS COMMUNICATION SYSTEM

(75) Inventors: Gene Beck Hahn, Gyeonggi-do (KR); Jae Hoon Chung, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/233,202

(22) PCT Filed: Aug. 17, 2012

(86) PCT No.: PCT/KR2012/006561
§ 371 (c)(1),
(2), (4) Date: Jan. 16, 2014

(87) PCT Pub. No.: WO2013/025077
PCT Pub. Date: Feb. 21, 2013

(65) Prior Publication Data
US 2014/0155062 A1 Jun. 5, 2014

Related U.S. Application Data

(60) Provisional application No. 61/524,779, filed on Aug. 18, 2011.

(51) Int. Cl.
*H04W 4/00* (2009.01)
*H04W 48/16* (2009.01)
*H04W 16/06* (2009.01)
*H04W 72/04* (2009.01)
*H04W 84/04* (2009.01)

(52) U.S. Cl.
CPC .............. *H04W 48/16* (2013.01); *H04W 16/06* (2013.01); *H04W 72/0453* (2013.01); *H04W 84/045* (2013.01)

(58) Field of Classification Search
CPC ....................................................... H04W 48/16
See application file for complete search history.

(56) References Cited

U.S. PATENT DOCUMENTS

| | | |
|---|---|---|
| 2009/0181672 A1 | 7/2009 | Horn et al. |
| 2010/0069062 A1 | 3/2010 | Horn et al. |
| 2010/0195573 A1 | 8/2010 | Gupta et al. |
| 2010/0238901 A1 | 9/2010 | Sampath et al. |
| 2013/0012249 A1* | 1/2013 | Centonza et al. ............. 455/501 |

OTHER PUBLICATIONS

International Search Report issued in corresponding International Patent Application No. PCT/KR2012/006561 dated Feb. 13, 2013.

* cited by examiner

*Primary Examiner* — Peter K Huntsinger
*Assistant Examiner* — Idowu O Osifade
(74) *Attorney, Agent, or Firm* — Morgan, Lewis & Bockius LLP

(57) ABSTRACT

A method for selecting a carrier in a wireless communication system is provided. A home eNodeB (HeNB) receives a carrier information response message as a response of the carrier information request message, and selects a primary cell (PCell) of the HeNB based on the received information on carriers used by the pico eNB. The carrier information response message includes the information on carriers used by a pico eNB.

17 Claims, 18 Drawing Sheets

FIG. 3
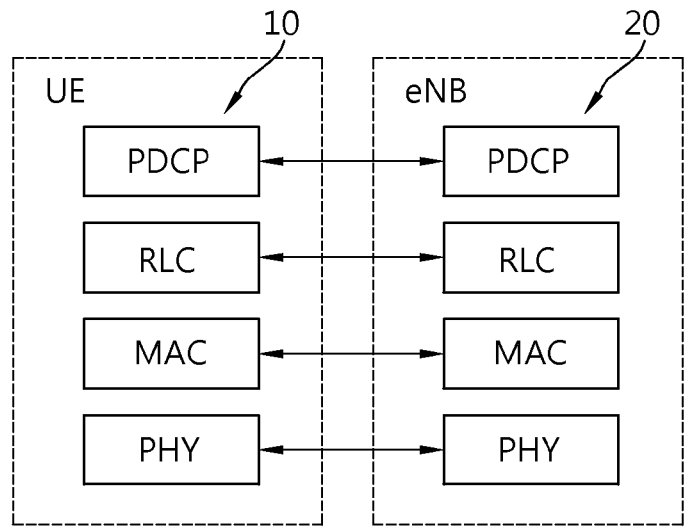
(a)
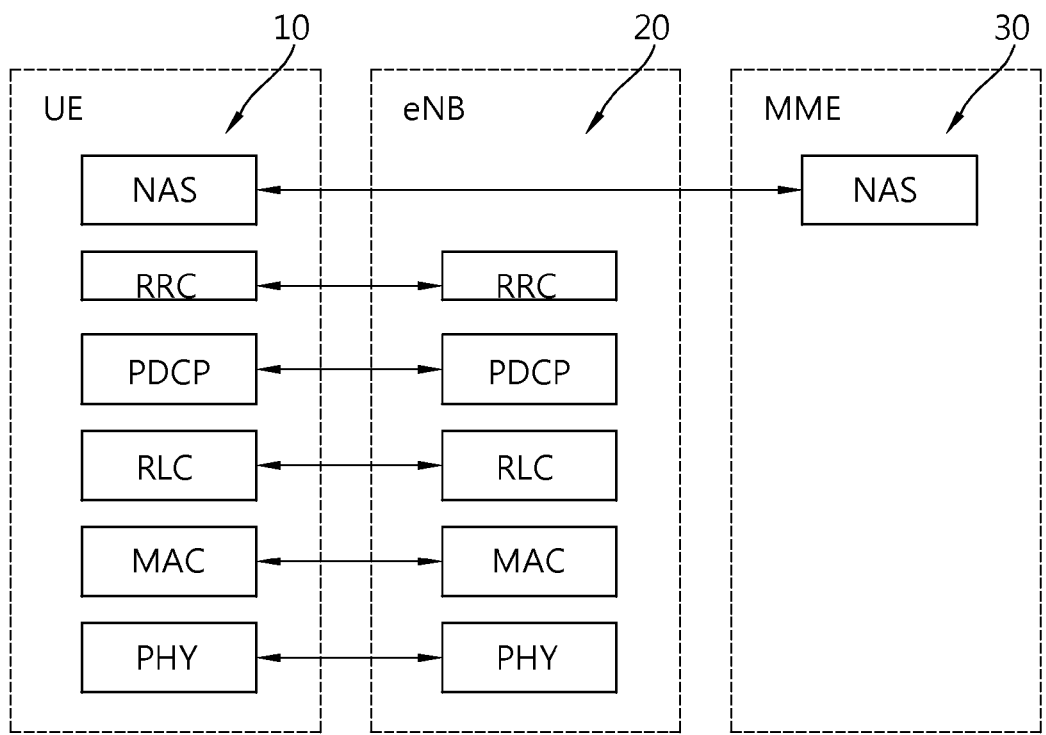
(b)

METHOD AND APPARATUS FOR SELECTING CARRIER IN WIRELESS COMMUNICATION SYSTEM

BACKGROUND OF THE INVENTION

1. Field of the Invention

The present invention relates to wireless communication, and more particularly, to a method and apparatus for selecting a carrier in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_SONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_SONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area.

If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

The specification of a home eNB (HeNB) is currently ongoing in 3GPP LTE. It may be referred to Paragraph 4.6.1 of 3GPP (3rd generation partnership project) TS 36.300 V 10.2.0 (2010-12). The HeNB is a small base station designed for use in residential or small business environment. The HeNB may be a femto cell. The HeNB is short range about tens of meter, installed by the consumer for better indoor voice and data reception.

FIG. 5 shows logical architecture of an E-UTRAN HeNB.

Referring to FIG. 5, a HeNB 50 may be connected with an EPC 60 through an S1 interface. A HeNB gateway (55, HeNB GW) may be deployed between the HeNB 50 and the EPC 60 to allow the S1 interface and to scale to support a large number of HeNBs. The HeNB GW 55 serves as a concentrator for the C(control)-Plane, specifically the S1-MME interface. The S1-U interface from the HeNB 50 may be terminated at the HeNB GW 55, or a direct logical U(user)-Plane connection between HeNB 50 and S-GW 56 may be used. The S1 interface may be defined as the interface between the HeNB GW 55 and the core network, between the HeNB 50 and the HeNB GW 55, between the HeNB 50 and the core network, and between the eNB and the core network. Also, the HeNB GW 55 appears to the MME as an eNB. The HeNB GW 55 appears to the HeNB as an MME. The S1 interface between the HeNB 50 and the EPC 60 is the same whether the HeNB 50 is connected to the EPC 60 via a HeNB GW 55 or not.

Inter-cell interference coordination (ICIC) has the task to manage radio resources such that inter-cell interference is kept under control. The ICIC mechanism includes a frequency domain component and time domain component. The preferred ICIC method may be different in the uplink and downlink.

Meanwhile, the 3GPP LTE rel-8 (hereinafter, rel-8) and the 3GPP LTE rel-10 (hereinafter, rel-10) ICIC mechanisms have been defined for intra-carrier cases. The rel-8 ICIC mechanism is designed for macro cell-only scenario. The Rel-10 ICIC mechanism is designed for scenarios of a macro cell and a femto cell as well as a macro cell and a pico cell. Now for 3GPP LTE rel-11, the method of autonomous interference management in a heterogeneous network (HetNet) with the mixture of different cell types and without tight synchronization requirements is regarded as a next step of further development for the optimal use of available frequency assets.

It is expected that the HetNet deployments in 3GPP LTE rel-11 basically assume that multiple carriers are used and carrier aggregation is supported. On the other hand, 3GPP LTE rel-10 uses single carrier. Therefore, when the ICIC mechanism is applied to the HetNet deployments in 3GPP LTE rel-11, there might be a few of considerations.

SUMMARY OF THE INVENTION

The present invention provides a method and apparatus for selecting a carrier in a wireless communication system. The present invention provides a method for a home eNodeB (HeNB) selecting a carrier in a heterogeneous network (HetNet).

In an aspect, a method for selecting, by a home eNodeB (HeNB), a carrier in a wireless communication system is provided. The method includes transmitting a carrier information request message including a request of information on carriers used by a pico eNB, receiving a carrier information response message as a response of the carrier information request message, the carrier information response message including the information on carriers used by the pico eNB, the information on carriers indicating information on user equipments (UEs) corresponding to the carriers used by the pico eNB, and selecting a primary cell (PCell) of the HeNB based on the received information on carriers used by the pico eNB.

In another aspect, a method for selecting, by a first home eNodeB (HeNB), a carrier in a wireless communication system is provided. The method includes transmitting a carrier information request message including a request of information on carriers used by a second HeNB, receiving a carrier information response message as a response of the carrier information request message, the carrier information response message including the information on carriers used by the second HeNB, the information on carriers indicating information on user equipments (UEs) corresponding to the carriers used by the second HeNB, and selecting a primary cell (PCell) of the first HeNB based on the received information on carriers used by the second HeNB.

Automatic self carrier selecting mechanism without the need for prior network planning can be provided.

BRIEF DESCRIPTION OF THE DRAWINGS

FIG. 3 shows a user-plane protocol and a control-plane protocol stack for the E-UMTS.

DESCRIPTION OF EXEMPLARY EMBODIMENTS

Figure 1:
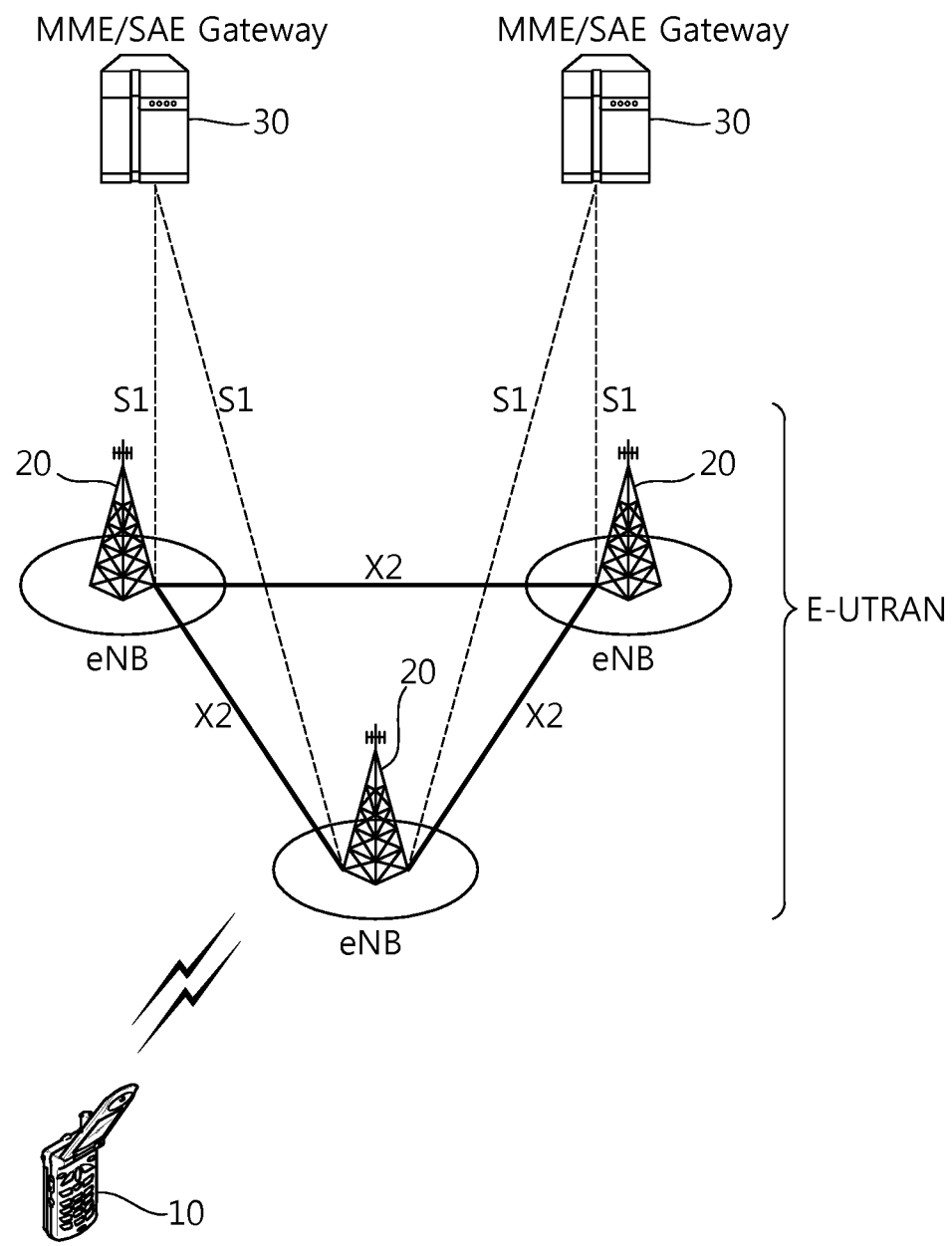
FIG. 1 shows network structure of an evolved universal mobile telecommunication system (E-UMTS). The E-UMTS may be also referred to as an LTE system.
Figure 2:
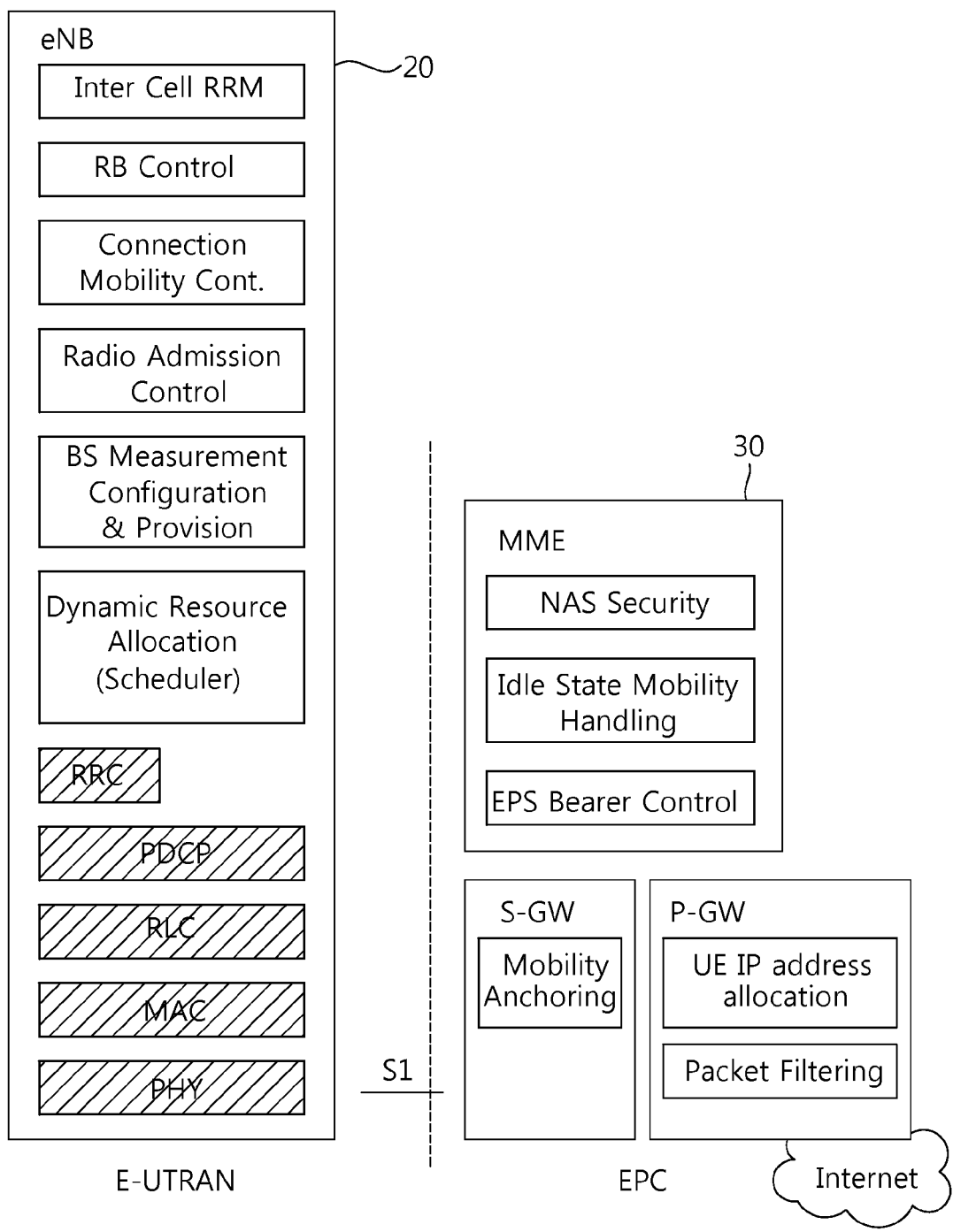
FIG. 2 shows architecture of a typical E-UTRAN and a typical EPC.
Figure 4:
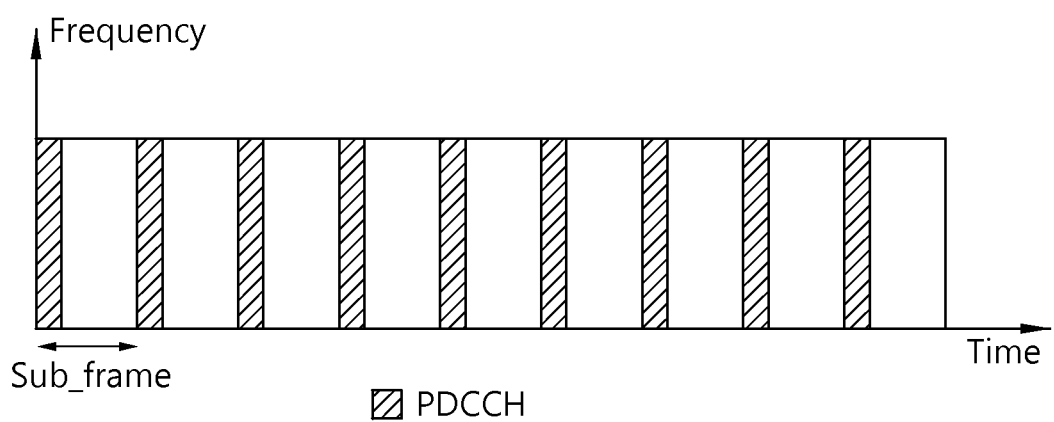
FIG. 4 shows an example of structure of a physical channel.
Figure 5:
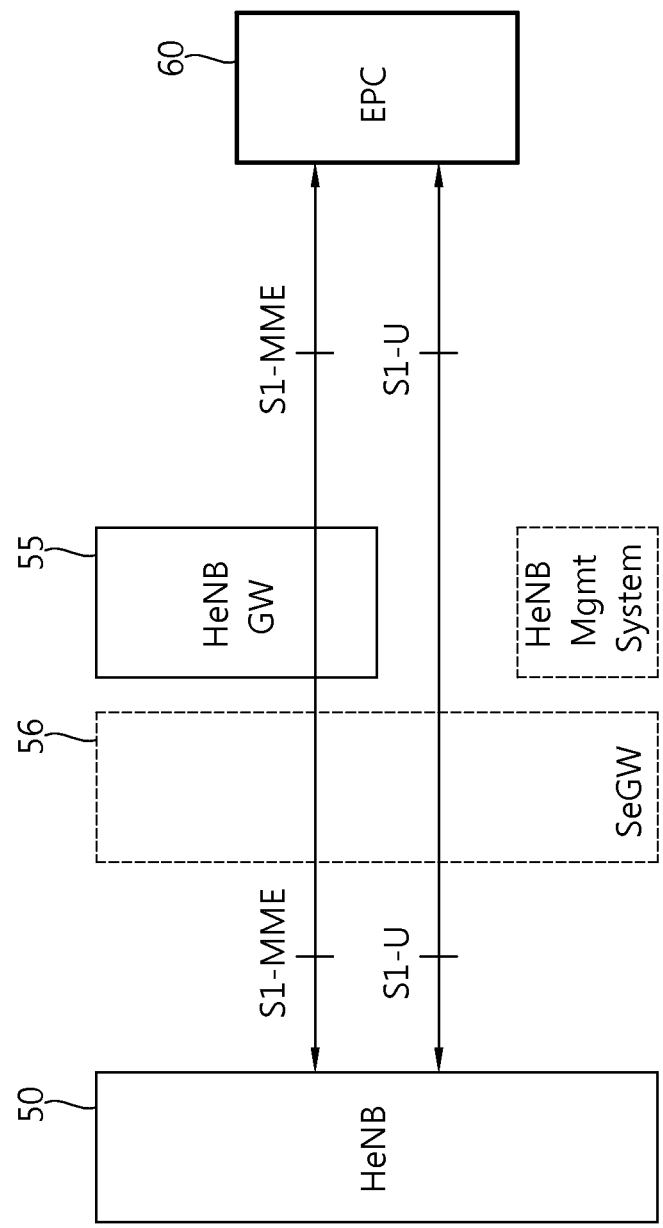
FIG. 5 shows logical architecture of an E-UTRAN HeNB.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

To meet the targets set by 3GPP LTE-A, e.g., bandwidth up to 100 MHz, peak data rates up to 1 Gbps in DL and peak data rates up to 500 Mbps in UL, carrier aggregation (CA) concept is introduced. In the CA, two or more component carriers (CCs) are aggregated in order to support wider transmission bandwidths up to 100 MHz. A UE may simultaneously receive or transmit on one or multiple CCs depending on its capabilities. That is, a rel-10 UE with reception and/or transmission capabilities for the CA can simultaneously receive and/or transmit on multiple CCs corresponding to multiple serving cells. A Rel-8/9 UE can receive on a single CC and transmit on a single CC corresponding to one serving cell only. The CA is supported for both contiguous and non-contiguous CCs. It is possible to configure a UE to aggregate a different number of CCs originating from the same eNB and of possibly different bandwidths in the UL and the DL. That is, the number of DL CCs that can be configured depends on the DL aggregation capability of the UE. The number of UL CCs that can be configured depends on the UL aggregation capability of the UE.

When the CA concept is applied to the scenarios of home eNodeB (HeNB) deployment, the HeNB can operate via a set of allowed carriers configured by operators. The basic principle is that each cell should at least select one active primary carrier. For example, it is assumed that there are two carriers, e.g., carrier A and carrier B. It is also assumed that there are two UEs, e.g., UE C and UE D. For the UE C, the carrier A can be assigned as a primary cell (PCell) and the carrier B can be assigned as a secondary cell (SCell). For the UE D, the carrier B can be assigned as a PCell and the carrier A can be assigned as a SCell. This is an example of CA configuration per UE basis.

On the other hand, in case that a HeNB is switched on, it shall start by selecting one carrier from the available carriers as its primary carrier. In this point, the network configured carriers and the UE-specific carriers shall not be treated equally. This is because the network configured carriers are selected and used prior to UE-specific carriers during the node initialization phase and the CA is configured for the UEs that have radio resource control (RRC) connection with the network. Also, due to the lack of synchronization requirements between a pico eNB (or already deployed HeNB) and a newly deployed HeNB, the interference related problems can happen between the pico eNB (or already deployed HeNB) and the newly deployed HeNB. For example, the newly deployed HeNB may select one carrier which is used by the pico eNB (or already deployed HeNB) as its PCell from the available carriers. Besides, in case that the pico eNB (or already deployed HeNB) and the newly deployed HeNB are already working, the information on which cell is configured for the PCell/SCell(s) of the pico eNB (or already deployed HeNB) can be a clue for newly deployed HeNB to configure its own PCell/SCell(s). This is because, again, due to the lack of synchronization requirements between the pico eNB (or already deployed HeNB) and the newly deployed HeNB, the interference related problems can happen between the pico eNB (or already deployed HeNB) and the newly deployed HeNB which are already working. Thus, some enhancements are needed for the method of carrier selection in a heterogeneous network (HetNet) environment.

There are several ways to resolve the problems mentioned above. Hereinafter, various examples of the proposed method for selecting a carrier in a HetNet according to the present invention are described. Basically, it is assumed that the newly deployed HeNB may measure a reference signal from a macro eNB when it is powered on. Also, in the present invention, it is assumed that all eNBs in the network keeps the information on which physical CCs (primary CC or secondary CC) are used by the UEs as the cells (PCell and/or SCell). As mentioned above, although a cell is assigned and uses a physical primary CC, the cell may be used as a SCell by the UE. By storing this information, the eNB can trace how many UEs are served by its physical primary CC either as a PCell or as a SCell. Similarly, the eNB can trace how many UEs are served by its physical secondary CC either as a PCell or as a SCell. Also, the eNB can trace how many radio resources are used within the corresponding carriers.

Figure 6:
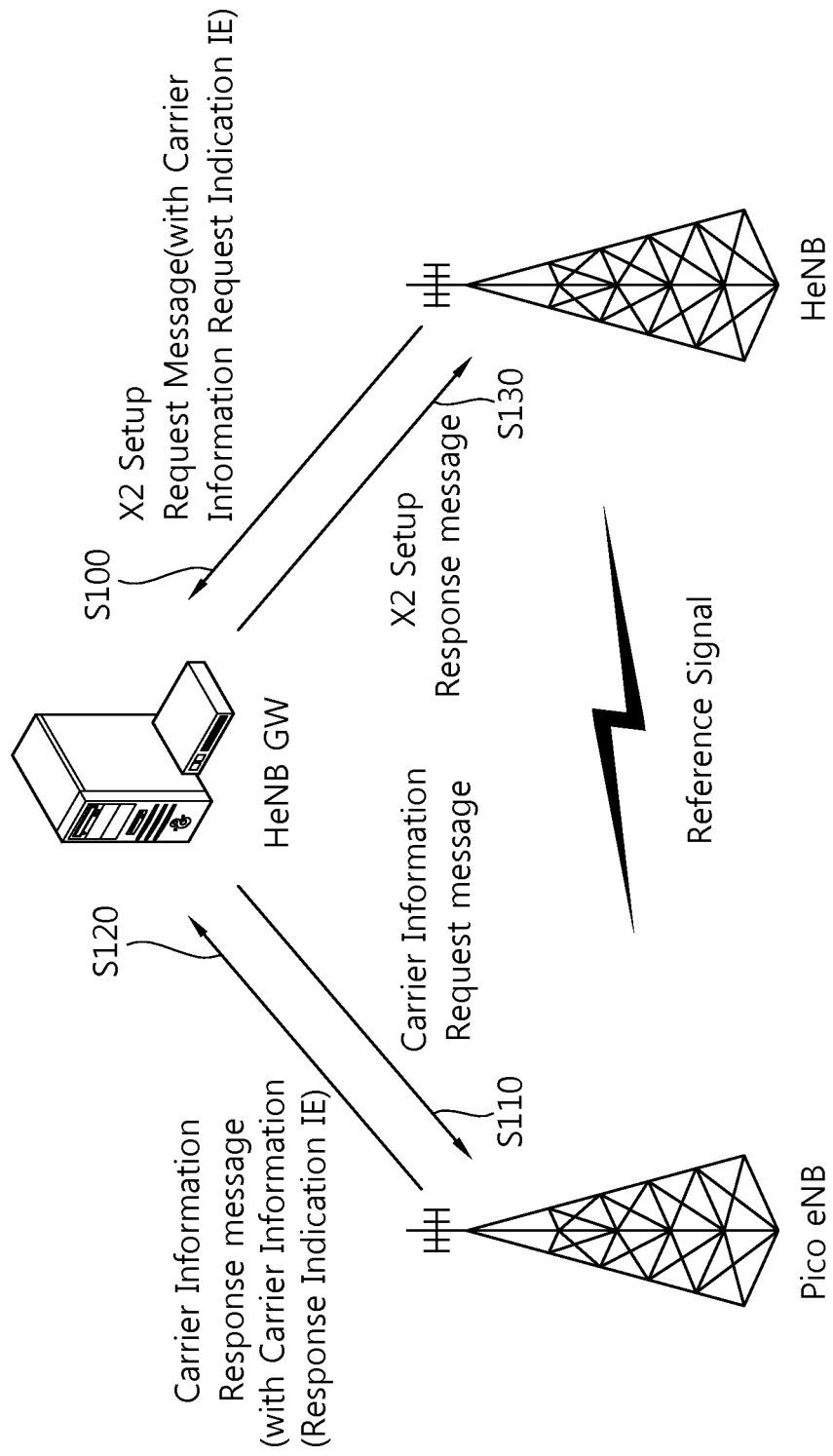
FIG. 6 shows an example of proposed method of selecting a carrier in a HetNet according to an embodiment of the present invention.

FIG. 6 shows an example of proposed method of selecting a carrier in a HetNet according to an embodiment of the present invention. This case is for the scenario where the pico eNB and the HeNB cannot setup the direct X2 interface between them.

Referring to FIG. 6, the newly deployed HeNB obtains the information required for carrier selection via the X2 setup procedure between the HeNB and the HeNB GW with the aid of the HeNB GW. Here, the HeNB is ready to first select the PCell.

At step S100, the HeNB transmits an X2 setup request message to the HeNB GW. The X2 setup request message may request the information on carriers used by the pico eNB by triggering the X2 setup procedure. The X2 setup request message may include carrier information request indication IE (information element) to obtain the information on the carriers used by the pico eNB received through the reference signal. The carrier information request indication IE may be added for the total number of carriers detected by the HeNB. Each carrier information request indication IE may include following information:
- Cell ID related information: physical cell ID (PCI), E-UTRAN cell global ID (ECGI), etc
- Other possible cell related information to identify the carriers used by the pico eNB received through the reference signal At step S110, the HeNB GW transmits a carrier information request message to the pico eNB. The carrier information request message may include the carrier information request indication IE included in the X2 setup request message.

At step S120, the pico eNB transmits a carrier information response message to the HeNB GW as a response of the carrier information request message. The carrier information response message may include carrier information response indication IE for the carriers mainly used by the pico eNB. The carrier information response indication IE may be added for the total number of carriers. Each carrier information response indication IE may include following information:
- Cell ID related information: PCI, ECGI, etc
- Information to identify the type of corresponding physical CC: physical primary CC, physical secondary CC
- Other possible cell related information to identify the carriers used by the pico eNB received through the reference signal
    - UE ratio indication IE: the number of UEs using this carrier as a PCell (primary high density, primary medium density, primary low density)
    - UE ratio indication IE: the number of UEs using this carrier as a SCell (secondary high density, secondary medium density, secondary low density}
    - resource usage status IE: resource usage status of corresponding carrier by UEs (high use, medium use, low use)—The resource usage status may be calculated for the DL/UL/total physical resource block (PRB) as defined in X2.

At step S130, the HeNB GW transmits an X2 setup response message to the HeNB as a response of the X2 setup request message. The X2 setup response message may include the carrier information response indication IE included in the carrier information response message.

When the HeNB receives the X2 setup response message from the HeNB GW, the HeNB may flexibly select its PCell based on the received information for mitigating the interference between itself and the neighbor pico eNB. There may be several possible cases to use the combination of information explained above. For example, if the UE ratio indication IE indicates high density, which means that many UEs use this carrier as a PCell and/or SCell, the HeNB may avoid using this carrier as a PCell. Although the UE ratio indication IE indicates medium density or low density, if the resource usage status IE indicates high use, then the HeNB may avoid using this carrier as a PCell. In this way, the coordinated/uncoordinated deployment of HeNB will benefit from having support of automatic carrier selection method.

Figure 7:
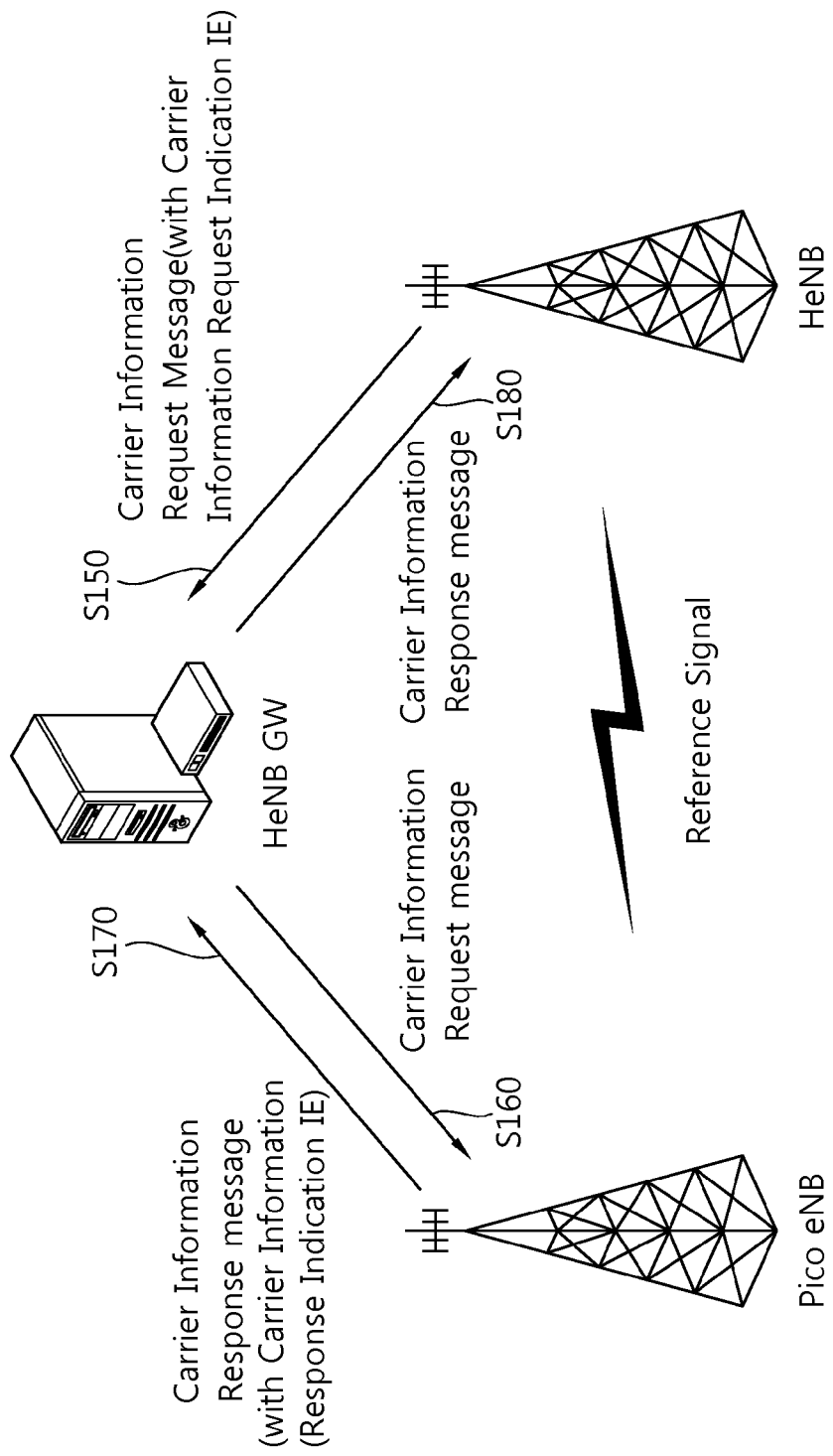
FIG. 7 shows another example of proposed method of selecting a carrier in a HetNet according to an embodiment of the present invention.

FIG. 7 shows another example of proposed method of selecting a carrier in a HetNet according to an embodiment of the present invention. This case is also for the scenario where the pico eNB and the HeNB cannot setup the direct X2 interface between them. This example may be performed after the indirect X2 interface is setup between the HeNB and the HeNB GW.

Referring to FIG. 7, the HeNB obtains the information required for carrier selection via a carrier information exchange procedure between the HeNB and the pico eNB with the aid of the HeNB GW. Here, the HeNB is ready to select the PCell.

At step S150, the HeNB transmits a carrier information request message to the HeNB GW. The carrier information request message may request the information on carriers used by the pico eNB by triggering the carrier information exchange procedure. The carrier information request message may include carrier information request indication IE to obtain the information on the carriers used by the pico eNB received through the reference signal. The information on the carriers use by the pico eNB may be also obtained via the X2 setup procedure between the HeNB GW and the HeNB. The carrier information request indication IE may be added for the total number of carriers detected by the HeNB. Each carrier information request indication IE may include following information:
- Cell ID related information: PCI, ECGI, etc
- Other possible cell related information to identify the carriers used by the pico eNB received through the reference signal At step S160, the HeNB GW forwards the carrier information request message to the pico eNB.

At step S170, the pico eNB transmits a carrier information response message to the HeNB GW as a response of the carrier information request message. The carrier information response message may include carrier information response indication IE for the carriers mainly used by the pico eNB. The carrier information response indication IE may be added for the total number of carriers. Each carrier information response indication IE may include following information:
- Cell ID related information: PCI, ECGI, etc
- Information to identify the type of corresponding physical CC: physical primary CC, physical secondary CC
- Other possible cell related information to identify the carriers used by the pico eNB received through the reference signal
    - UE ratio indication IE: the number of UEs using this carrier as a PCell (primary high density, primary medium density, primary low density)
    - UE ratio indication IE: the number of UEs using this carrier as a SCell (secondary high density, secondary medium density, secondary low density}
    - resource usage status IE: resource usage status of corresponding carrier by UEs (high use, medium use, low use)—The resource usage status may be calculated for the DL/UL/total physical resource block (PRB) as defined in X2.

At step S180, the HeNB GW forwards the carrier information response message to the HeNB.

When the HeNB receives the carrier information response message from the HeNB GW, the HeNB may flexibly select its PCell based on the received information for mitigating the interference between itself and the neighbor pico eNB. There may be several possible cases to use the combination of information explained above. For example, if the UE ratio indication IE indicates high density, which means that many UEs use this carrier as a PCell and/or SCell, the HeNB may avoid using this carrier as a PCell. Although the UE ratio indication IE indicates medium density or low density, if the resource usage status IE indicates high use, then the HeNB may avoid using this carrier as a PCell. In this way, the coordinated/uncoordinated deployment of HeNB will benefit from having support of automatic carrier selection method.

The carrier information request/response messages mentioned above are the simple examples of messages exchanged between the pico eNB and the HeNB to achieve the interference mitigation between them. That is, the carrier information request/response indications described in the above examples may be substituted with the existing X2 messages, e.g., resource status request/response/update message, load information message, etc.

Figure 8:
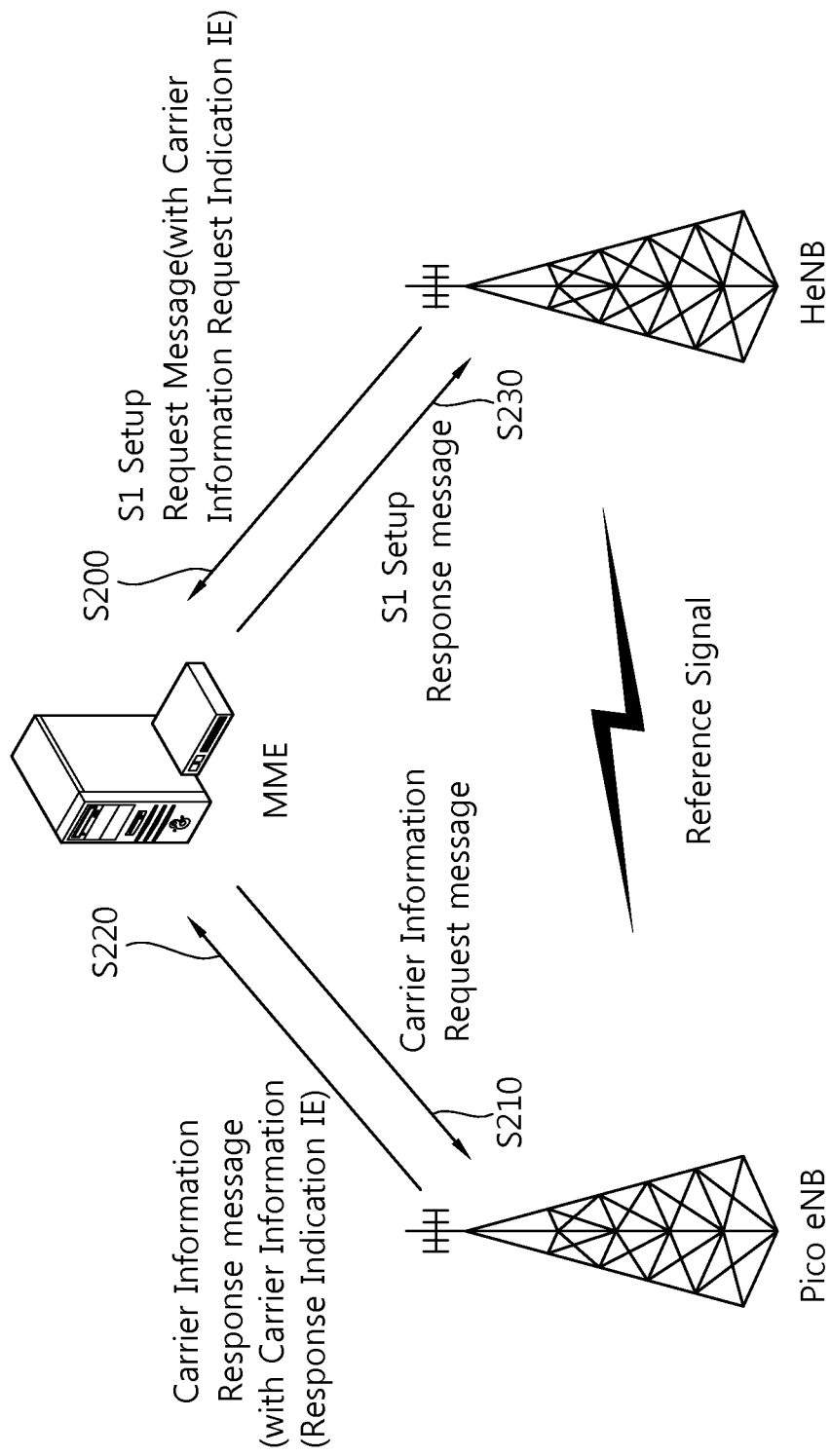
FIG. 8 shows another example of proposed method of selecting a carrier in a HetNet according to an embodiment of the present invention.

FIG. 8 shows another example of proposed method of selecting a carrier in a HetNet according to an embodiment of the present invention. This case is also for the scenario where the pico eNB and the HeNB cannot setup the direct X2 interface between them.

Referring to FIG. 8, the newly deployed HeNB obtains the information required for carrier selection via the S1 setup procedure between the HeNB and the MME with the aid of the MME. Here, the HeNB is ready to first select the PCell.

At step S200, the HeNB transmits an S1 setup request message to the MME. The S1 setup request message may request the information on carriers used by the pico eNB by triggering the S1 setup procedure. The S1 setup request message may include carrier information request indication IE to obtain the information on the carriers used by the pico eNB received through the reference signal. The carrier information request indication IE may be added for the total number of carriers detected by the HeNB. Each carrier information request indication IE may include following information:
  Cell ID related information: PCI, ECGI, etc
  Other possible cell related information to identify the carriers used by the pico eNB received through the reference signal At step S210, the MME transmits a carrier information request message to the pico eNB. The carrier information request message may include the carrier information request indication IE included in the S1 setup request message.

At step S220, the pico eNB transmits a carrier information response message to the MME as a response of the carrier information request message. The carrier information response message may include carrier information response indication IE for the carriers mainly used by the pico eNB. The carrier information response indication IE may be added for the total number of carriers. Each carrier information response indication IE may include following information:
  Cell ID related information: PCI, ECGI, etc
  Information to identify the type of corresponding physical CC: physical primary CC, physical secondary CC
  Other possible cell related information to identify the carriers used by the pico eNB received through the reference signal
    UE ratio indication IE: the number of UEs using this carrier as a PCell (primary high density, primary medium density, primary low density)
    UE ratio indication IE: the number of UEs using this carrier as a SCell (secondary high density, secondary medium density, secondary low density}
    resource usage status IE: resource usage status of corresponding carrier by UEs (high use, medium use, low use)—The resource usage status may be calculated for the DL/UL/total physical resource block (PRB) as defined in X2.

At step S230, the MME transmits an S1 setup response message to the HeNB as a response of the S1 setup request message. The S1 setup response message may include the carrier information response indication IE included in the carrier information response message.

When the HeNB receives the S1 setup response message from the MME, the HeNB may flexibly select its PCell based on the received information for mitigating the interference between itself and the neighbor pico eNB. There may be several possible cases to use the combination of information explained above. For example, if the UE ratio indication IE indicates high density, which means that many UEs use this carrier as a PCell and/or SCell, the HeNB may avoid using this carrier as a PCell. Although the UE ratio indication IE indicates medium density or low density, if the resource usage status IE indicates high use, then the HeNB may avoid using this carrier as a PCell. In this way, the coordinated/uncoordinated deployment of HeNB will benefit from having support of automatic carrier selection method.

Figure 9:
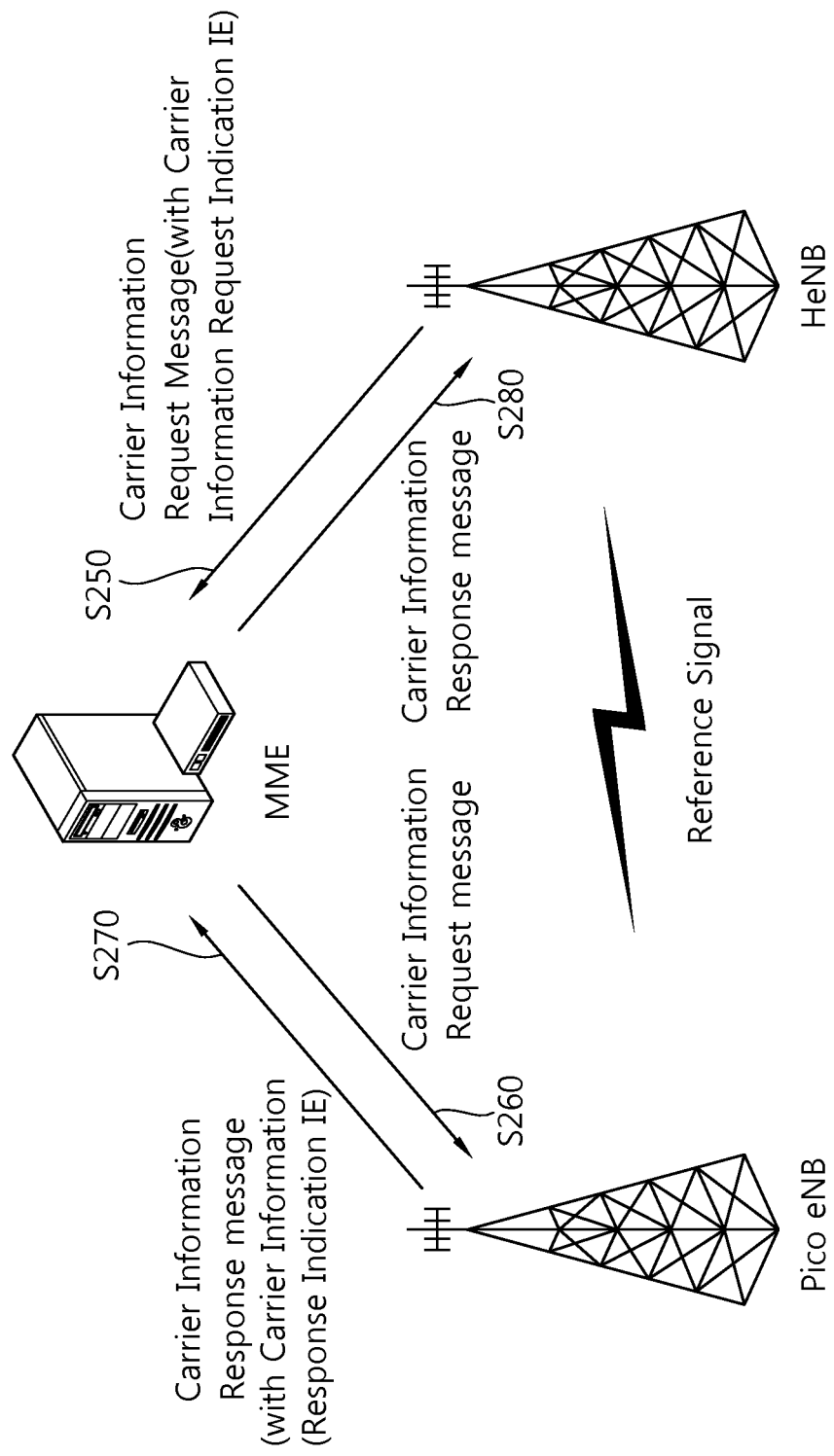
FIG. 9 shows another example of proposed method of selecting a carrier in a HetNet according to an embodiment of the present invention.

FIG. 9 shows another example of proposed method of selecting a carrier in a HetNet according to an embodiment of the present invention. This case is also for the scenario where the pico eNB and the HeNB cannot setup the direct X2 interface between them. This example may be performed after the S1 interface is setup between the HeNB and the MME.

Referring to FIG. 9, the HeNB obtains the information required for carrier selection via a carrier information exchange procedure between the HeNB and the pico eNB with the aid of the MME. Here, the HeNB is ready to select the PCell.

At step S250, the HeNB transmits a carrier information request message to the MME. The carrier information request message may request the information on carriers used by the pico eNB by triggering the carrier information exchange procedure. The carrier information request message may include carrier information request indication IE to obtain the information on the carriers used by the pico eNB received through the reference signal. The information on the carriers use by the pico eNB may be also obtained via the S1 setup procedure between the MME and the HeNB. The carrier information request indication IE may be added for the total number of carriers detected by the HeNB. Each carrier information request indication IE may include following information:
  Cell ID related information: PCI, ECGI, etc
  Other possible cell related information to identify the carriers used by the pico eNB received through the reference signal At step S260, the MME forwards the carrier information request message to the pico eNB.

At step S270, the pico eNB transmits a carrier information response message to the MME as a response of the carrier information request message. The carrier information response message may include carrier information response indication IE for the carriers mainly used by the pico eNB. The carrier information response indication IE may be added for the total number of carriers. Each carrier information response indication IE may include following information:
  Cell ID related information: PCI, ECGI, etc
  Information to identify the type of corresponding physical CC: physical primary CC, physical secondary CC
  Other possible cell related information to identify the carriers used by the pico eNB received through the reference signal
    UE ratio indication IE: the number of UEs using this carrier as a PCell (primary high density, primary medium density, primary low density)
    UE ratio indication IE: the number of UEs using this carrier as a SCell (secondary high density, secondary medium density, secondary low density}
    resource usage status IE: resource usage status of corresponding carrier by UEs (high use, medium use, low use)—The resource usage status may be calculated for the DL/UL/total physical resource block (PRB) as defined in X2.

At step S280, the MME forwards the carrier information response message to the HeNB.

When the HeNB receives the carrier information response message from the MME, the HeNB may flexibly select its PCell based on the received information for mitigating the interference between itself and the neighbor pico eNB. There may be several possible cases to use the combination of information explained above. For example, if the UE ratio indication IE indicates high density, which means that many UEs use this carrier as a PCell and/or SCell, the HeNB may avoid using this carrier as a PCell. Although the UE ratio indication IE indicates medium density or low density, if the resource usage status IE indicates high use, then the HeNB may avoid using this carrier as a PCell. In this way, the uncoordinated deployment of HeNB will benefit from having support of automatic carrier selection method.

The carrier information request/response messages mentioned above are the simple examples of messages exchanged between the pico eNB and the HeNB to achieve the interference mitigation between them. That is, the carrier information request/response indications described in the above examples may be substituted with the existing X2 messages, e.g., resource status request/response/update message, load information message, etc.

Figure 10:
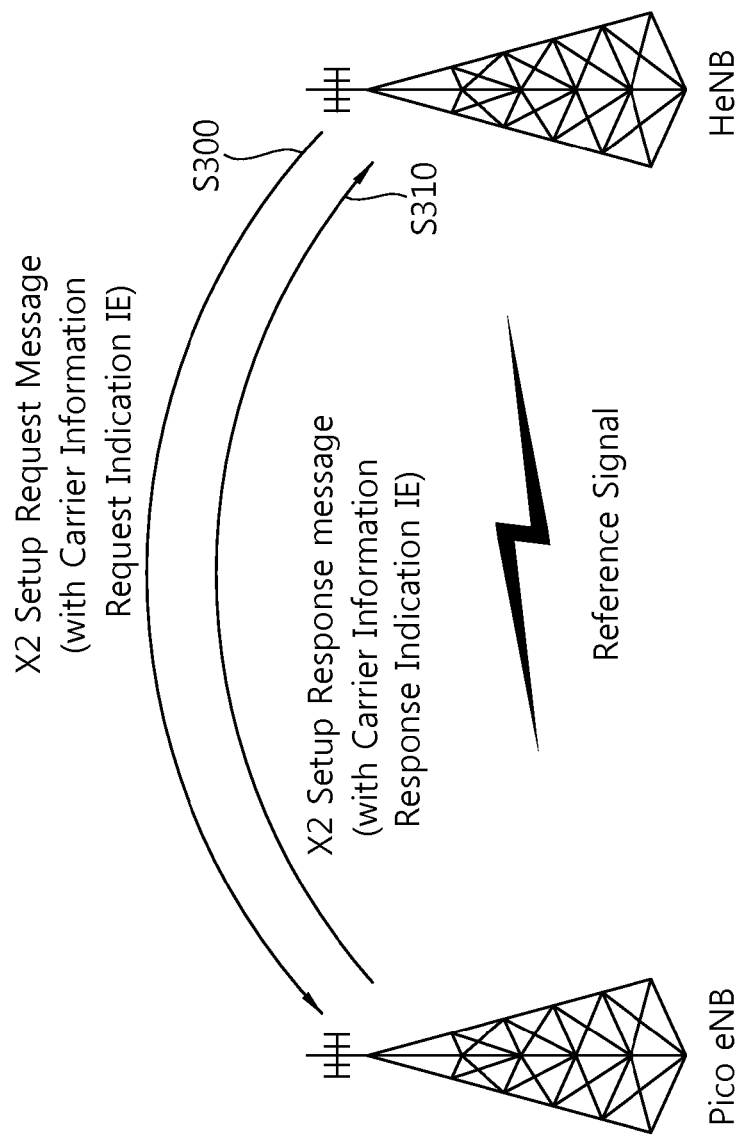
FIG. 10 shows another example of proposed method of selecting a carrier in a HetNet according to an embodiment of the present invention.

FIG. 10 shows another example of proposed method of selecting a carrier in a HetNet according to an embodiment of the present invention. This case is for the scenario where the pico eNB and the HeNB can setup the direct X2 interface between them.

Referring to FIG. 10, the newly deployed HeNB obtains the information required for carrier selection via the X2 setup procedure directly between the HeNB and the pico eNB. Here, the HeNB is ready to first select the PCell.

At step S300, the HeNB transmits an X2 setup request message to the pico eNB. The X2 setup request message may request the information on carriers used by the pico eNB by triggering the X2 setup procedure. The X2 setup request message may include carrier information request indication IE to obtain the information on the carriers used by the pico eNB received through the reference signal. The carrier information request indication IE may be added for the total number of carriers detected by the HeNB. Each carrier information request indication IE may include following information:
  Cell ID related information: PCI, ECGI, etc
  Other possible cell related information to identify the carriers used by the pico eNB received through the reference signal At step S310, the pico eNB transmits an X2 setup response message to the HeNB as a response of the X2 setup request message. The X2 setup response message may include carrier information response indication IE for the carriers mainly used by the pico eNB. The carrier information response indication IE may be added for the total number of carriers. Each carrier information response indication IE may include following information:
  Cell ID related information: PCI, ECGI, etc
  Information to identify the type of corresponding physical CC: physical primary CC, physical secondary CC
  Other possible cell related information to identify the carriers used by the pico eNB received through the reference signal
    UE ratio indication IE: the number of UEs using this carrier as a PCell (primary high density, primary medium density, primary low density)
    UE ratio indication IE: the number of UEs using this carrier as a SCell (secondary high density, secondary medium density, secondary low density}
  resource usage status IE: resource usage status of corresponding carrier by UEs (high use, medium use, low use)—The resource usage status may be calculated for the DL/UL/total physical resource block (PRB) as defined in X2.

When the HeNB receives the X2 setup response message from the pico eNB, the HeNB may flexibly select its PCell based on the received information for mitigating the interference between itself and the neighbor pico eNB. There may be several possible cases to use the combination of information explained above. For example, if the UE ratio indication IE indicates high density, which means that many UEs use this carrier as a PCell and/or SCell, the HeNB may avoid using this carrier as a PCell. Although the UE ratio indication IE indicates medium density or low density, if the resource usage status IE indicates high use, then the HeNB may avoid using this carrier as a PCell. In this way, the deployment of the HeNB will benefit from having support of automatic carrier selection method.

Figure 11:
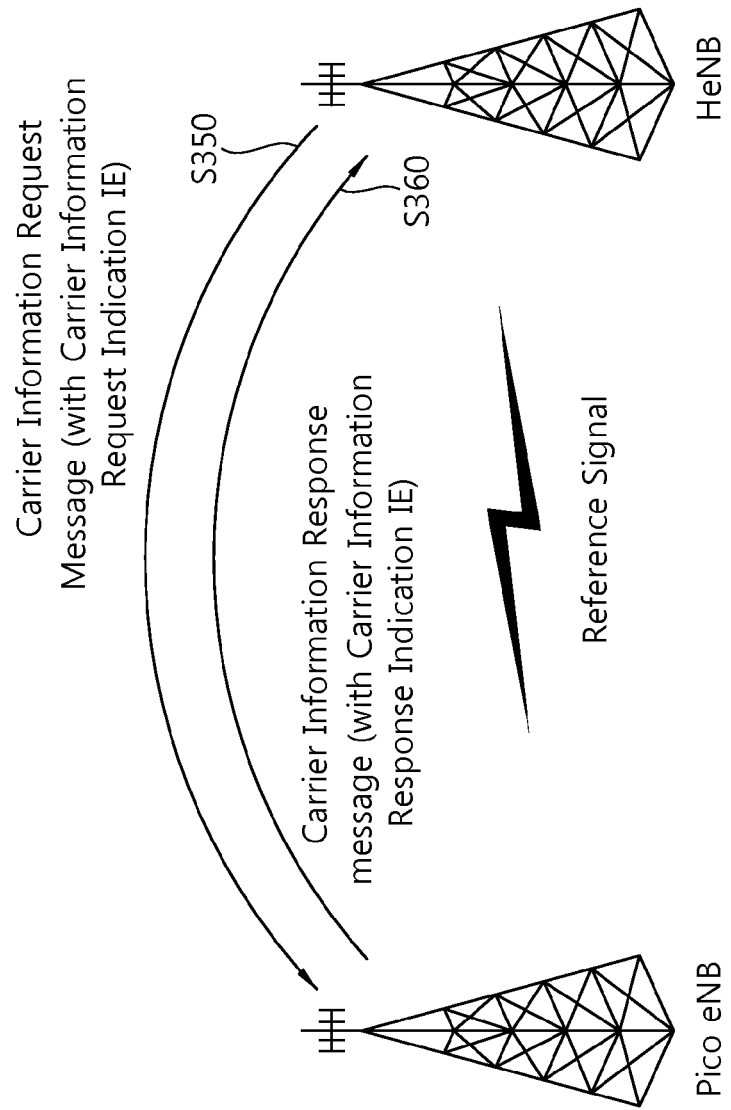
FIG. 11 shows another example of proposed method of selecting a carrier in a HetNet according to an embodiment of the present invention.

FIG. 11 shows another example of proposed method of selecting a carrier in a HetNet according to an embodiment of the present invention. This case is also for the scenario where the pico eNB and the HeNB can setup the direct X2 interface between them. This example may be performed after the direct X2 interface is setup between the HeNB and the pico eNB.

Referring to FIG. 11, the HeNB obtains the information required for carrier selection via the carrier information exchange procedure directly between the HeNB and the pico eNB. Here, the HeNB is ready to select the PCell.

At step S350, the HeNB transmits a carrier information request message to the pico eNB. The carrier information request message may request the information on carriers used by the pico eNB by triggering the carrier information exchange procedure. The carrier information request message may include carrier information request indication IE to obtain the information on the carriers used by the pico eNB received through the reference signal. The information on the carriers use by the pico eNB may be also obtained via the X2 setup procedure between the pico eNB and the HeNB directly. The carrier information request indication IE may be added for the total number of carriers detected by the HeNB. Each carrier information request indication IE may include following information:
  Cell ID related information: physical cell ID (PCI), E-UTRAN cell global ID (ECGI), etc
  Other possible cell related information to identify the carriers used by the pico eNB received through the reference signal At step S360, the pico eNB transmits a carrier information response message to the HeNB as a response of the carrier information request message. The carrier information response message may include carrier information response indication IE for the carriers mainly used by the pico eNB. The carrier information response indication IE may be added for the total number of carriers. Each carrier information response indication IE may include following information:
  Cell ID related information: PCI, ECGI, etc
  Information to identify the type of corresponding physical CC: physical primary CC, physical secondary CC
  Other possible cell related information to identify the carriers used by the pico eNB received through the reference signal
    UE ratio indication IE: the number of UEs using this carrier as a PCell (primary high density, primary medium density, primary low density)
    UE ratio indication IE: the number of UEs using this carrier as a SCell (secondary high density, secondary medium density, secondary low density} resource usage status IE: resource usage status of corresponding carrier by UEs (high use, medium use, low use)—The resource usage status may be calculated for the DL/UL/total physical resource block (PRB) as defined in X2.

When the HeNB receives the carrier information response message from the pico eNB, the HeNB may flexibly select its PCell based on the received information for mitigating the interference between itself and the neighbor pico eNB. There may be several possible cases to use the combination of information explained above. For example, if the UE ratio indication IE indicates high density, which means that many UEs use this carrier as a PCell and/or SCell, the HeNB may avoid using this carrier as a PCell. Although the UE ratio indication IE indicates medium density or low density, if the resource usage status IE indicates high use, then the HeNB may avoid using this carrier as a PCell. In this way, the deployment of the HeNB will benefit from having support of automatic carrier selection method.

The carrier information request/response messages mentioned above are the simple examples of messages exchanged between the pico eNB and the HeNB to achieve the interference mitigation between them. That is, the carrier information request/response indications described in the above examples may be substituted with the existing X2 messages, e.g., resource status request/response/update message, load information message, etc.

The present invention described above may be applied between HeNBs.

Figure 12:
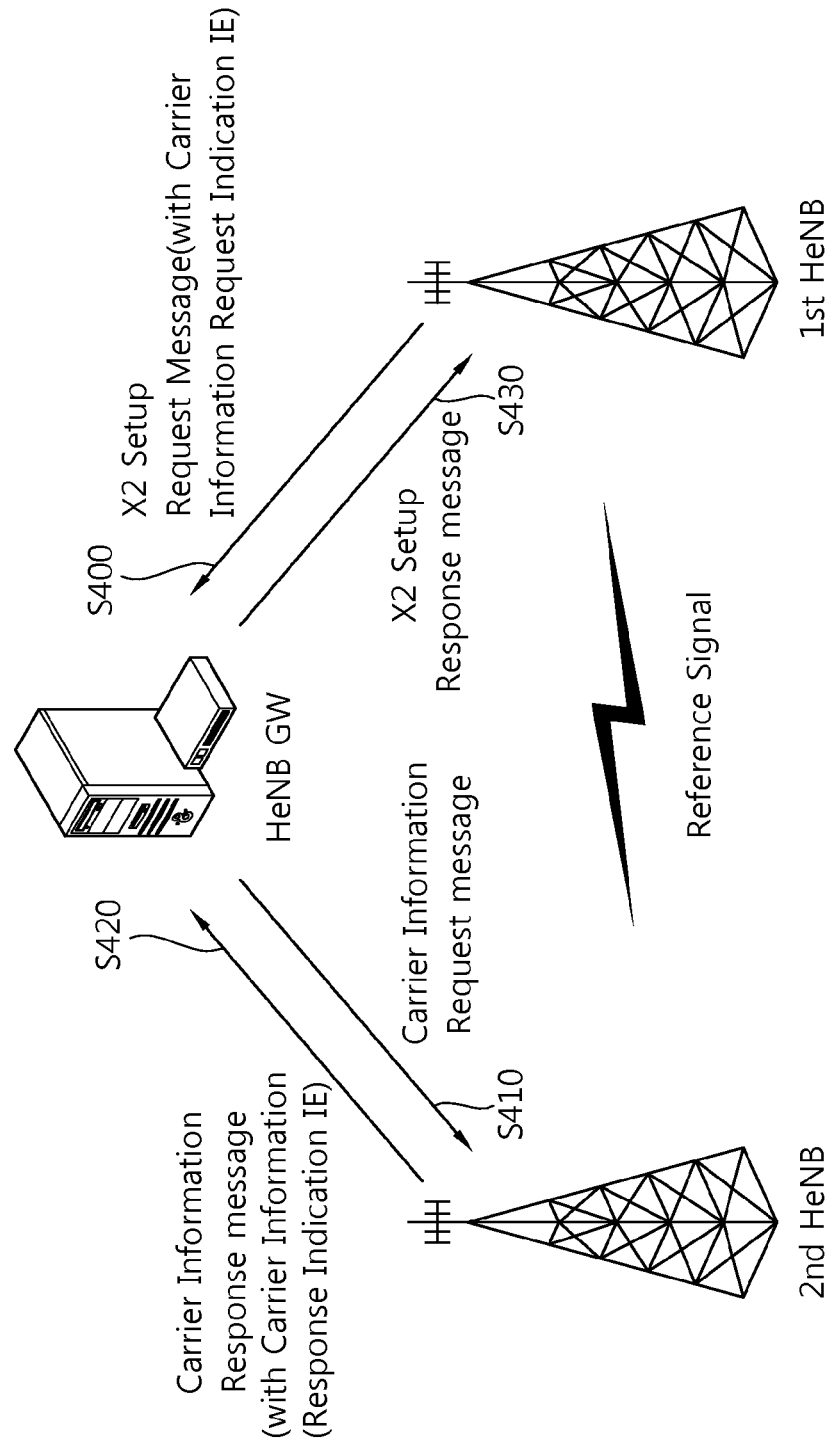
FIG. 12 shows another example of proposed method of selecting a carrier in a HetNet according to an embodiment of the present invention.

FIG. 12 shows another example of proposed method of selecting a carrier in a HetNet according to an embodiment of the present invention. This case is for the scenario where the HeNBs with different closed subscription group (CSG) IDs cannot setup the direct X2 interface between them. Referring to FIG. 12, the newly deployed first HeNB obtains the information required for carrier selection via the X2 setup procedure between the first HeNB and the HeNB GW with the aid of the HeNB GW.

At step S400, the first HeNB transmits an X2 setup request message to the HeNB GW. At step S410, the HeNB GW transmits a carrier information request message to the second HeNB. At step S420, the second HeNB transmits a carrier information response message to the HeNB GW as a response of the carrier information request message. At step S430, the HeNB GW transmits an X2 setup response message to the first HeNB as a response of the X2 setup request message. The detail operation of step S400 to step S430 may be the same as step S100 to step S130 of FIG. 6 respectively.

Figure 13:
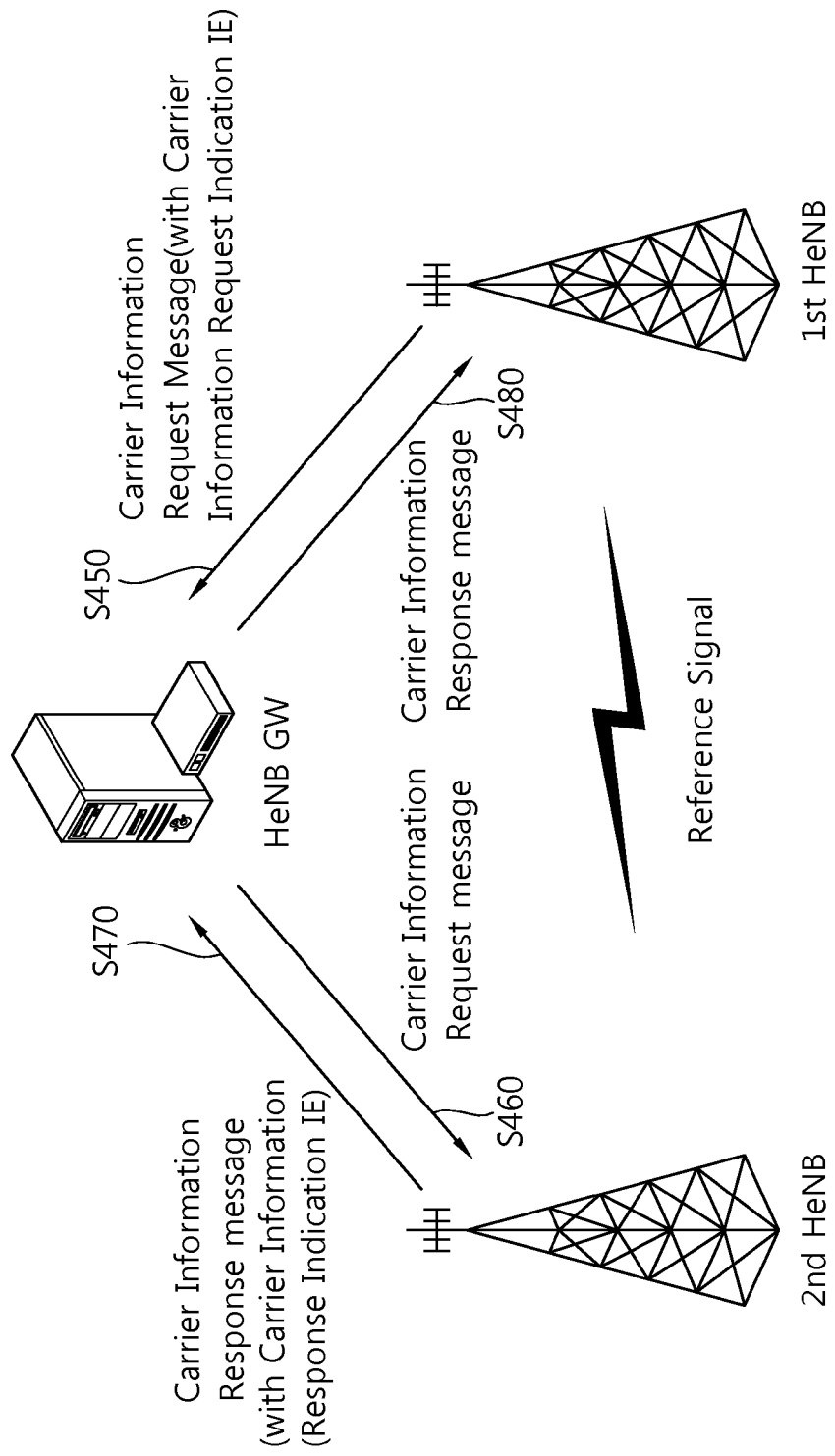
FIG. 13 shows another example of proposed method of selecting a carrier in a HetNet according to an embodiment of the present invention.

FIG. 13 shows another example of proposed method of selecting a carrier in a HetNet according to an embodiment of the present invention. This case is also for the scenario where the HeNBs with different CSG IDs cannot setup the direct X2 interface between them. This example may be performed after the indirect X2 interface is setup between the HeNBs. Referring to FIG. 13, the first HeNB obtains the information required for carrier selection via a carrier information exchange procedure between the first HeNB and the second HeNB with the aid of the HeNB GW.

At step S450, the first HeNB transmits a carrier information request message to the HeNB GW. At step S460, the HeNB GW forwards the carrier information request message to the second HeNB. At step S470, the second HeNB transmits a carrier information response message to the HeNB GW as a response of the carrier information request message. At step S480, the HeNB GW forwards the carrier information response message to the first HeNB. The detail operation of step S450 to step S480 may be the same as step S150 to step S180 of FIG. 7 respectively.

Figure 14:
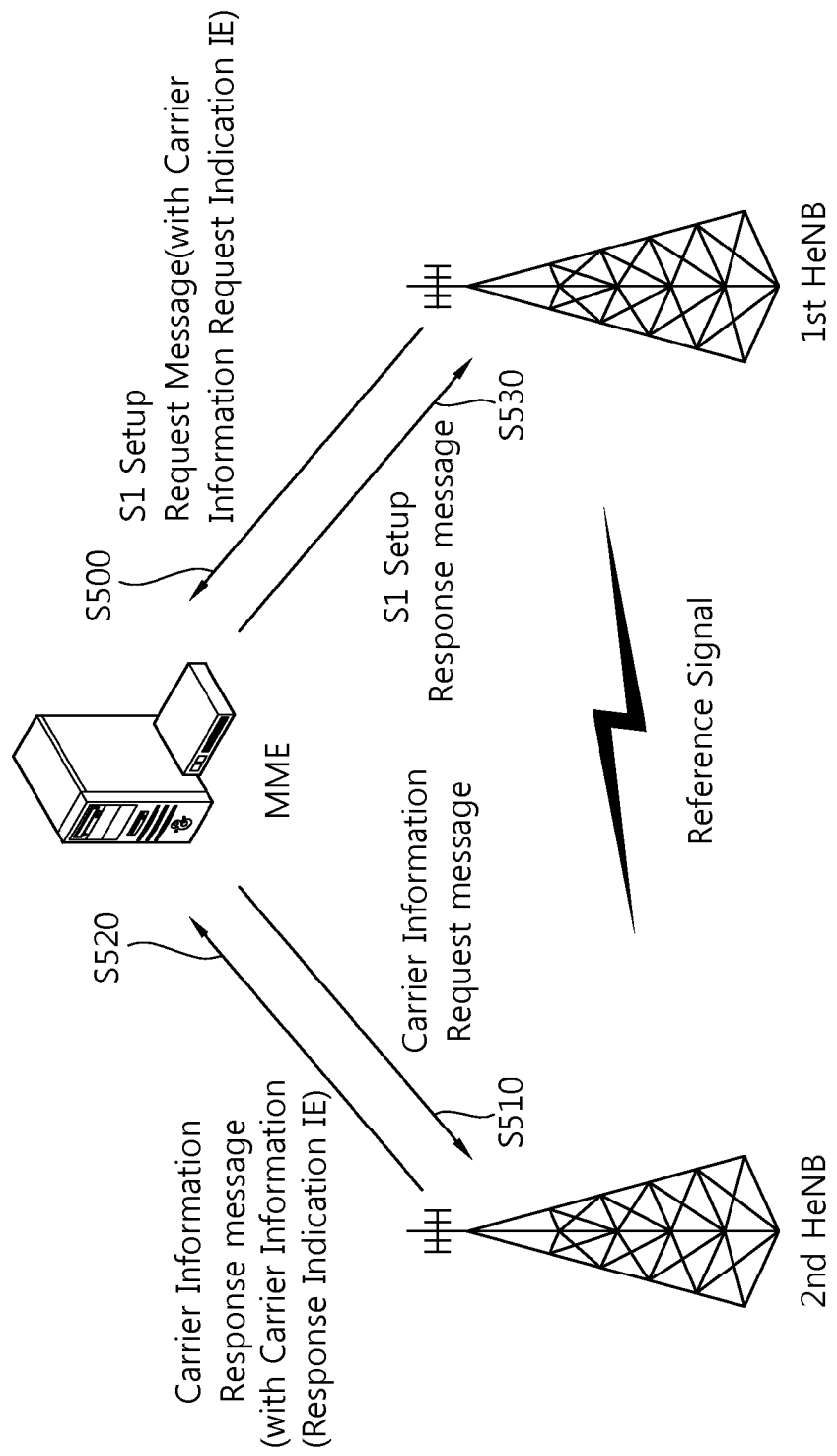
FIG. 14 shows another example of proposed method of selecting a carrier in a HetNet according to an embodiment of the present invention.

FIG. 14 shows another example of proposed method of selecting a carrier in a HetNet according to an embodiment of the present invention. This case is also for the scenario where the HeNBs with different CSG IDs cannot setup the direct X2 interface between them. Referring to FIG. 14, the newly deployed first HeNB obtains the information required for carrier selection via the S1 setup procedure between the first HeNB and the MME with the aid of the MME.

At step S500, the first HeNB transmits an S1 setup request message to the MME. At step S510, the MME transmits a carrier information request message to the second HeNB. At step S520, the second HeNB transmits a carrier information response message to the MME as a response of the carrier information request message. At step S530, the MME transmits an S1 setup response message to the first HeNB as a response of the S1 setup request message. The detail operation of step S500 to step S530 may be the same as step S200 to step S230 of FIG. 8 respectively.

Figure 15:
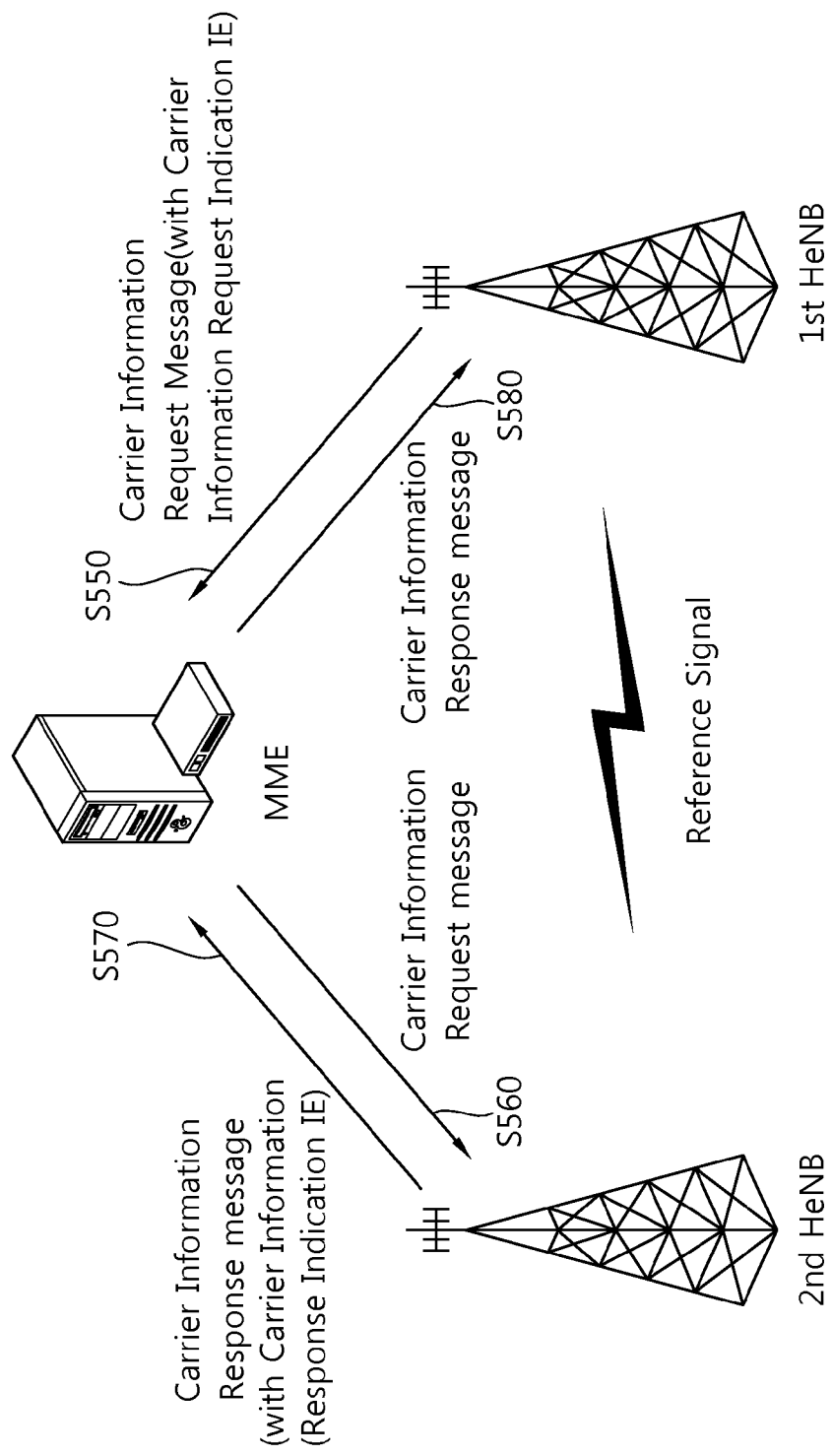
FIG. 15 shows another example of proposed method of selecting a carrier in a HetNet according to an embodiment of the present invention.

FIG. 15 shows another example of proposed method of selecting a carrier in a HetNet according to an embodiment of the present invention. This case is also for the scenario where the HeNBs with different CSG IDs cannot setup the direct X2 interface between them. This example may be performed after the S1 interface is setup between the HeNB and the MME. Referring to FIG. 15, the first HeNB obtains the information required for carrier selection via a carrier information exchange procedure between the HeNBs with the aid of the MME.

At step S550, the first HeNB transmits a carrier information request message to the MME. At step S560, the MME forwards the carrier information request message to the second HeNB. At step S570, the second HeNB transmits a carrier information response message to the MME as a response of the carrier information request message. At step S580, the MME forwards the carrier information response message to the first HeNB. The detail operation of step S550 to step S580 may be the same as step S250 to step S280 of FIG. 9 respectively.

Figure 16:
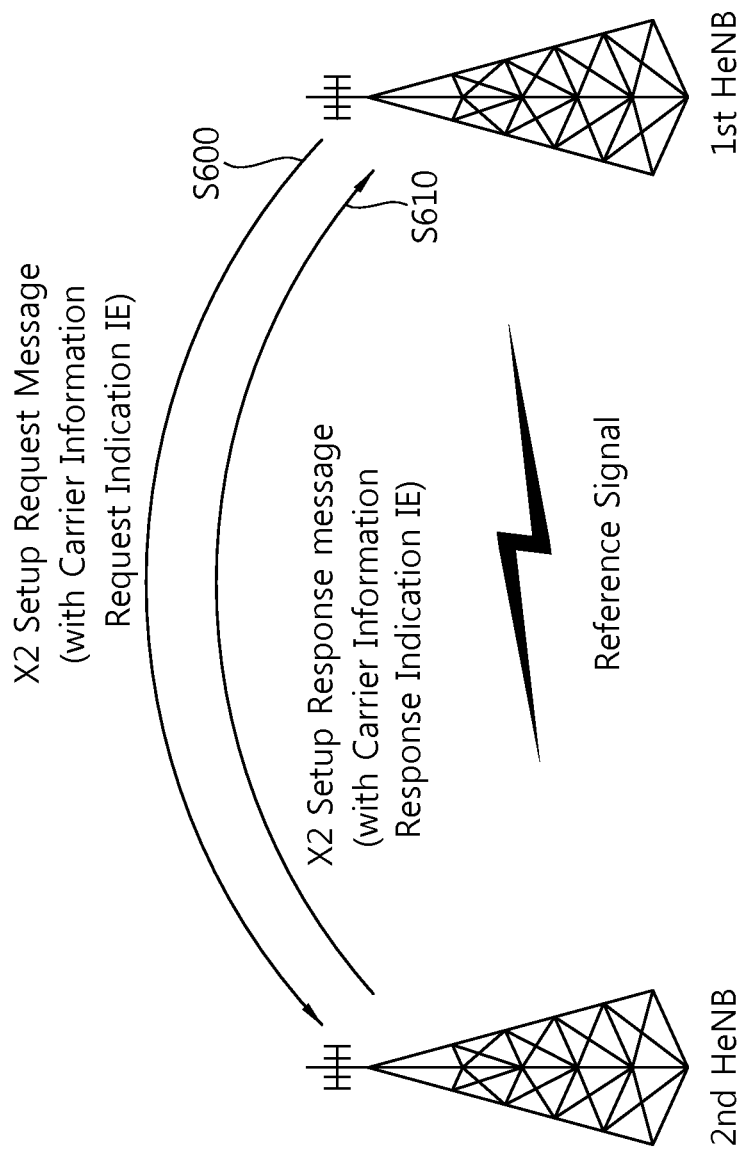
FIG. 16 shows another example of proposed method of selecting a carrier in a HetNet according to an embodiment of the present invention.

FIG. 16 shows another example of proposed method of selecting a carrier in a HetNet according to an embodiment of the present invention. This case is for the scenario where the HeNBs with different CSG IDs can setup the direct X2 interface between them. Referring to FIG. 16, the newly deployed first HeNB obtains the information required for carrier selection via the X2 setup procedure directly between the HeNBs.

At step S600, the first HeNB transmits an X2 setup request message to the second HeNB. At step S610, the second HeNB transmits an X2 setup response message to the first HeNB as a response of the X2 setup request message. The detail operation of step S600 to step S610 may be the same as step S300 to step S310 of FIG. 10 respectively.

Figure 17:
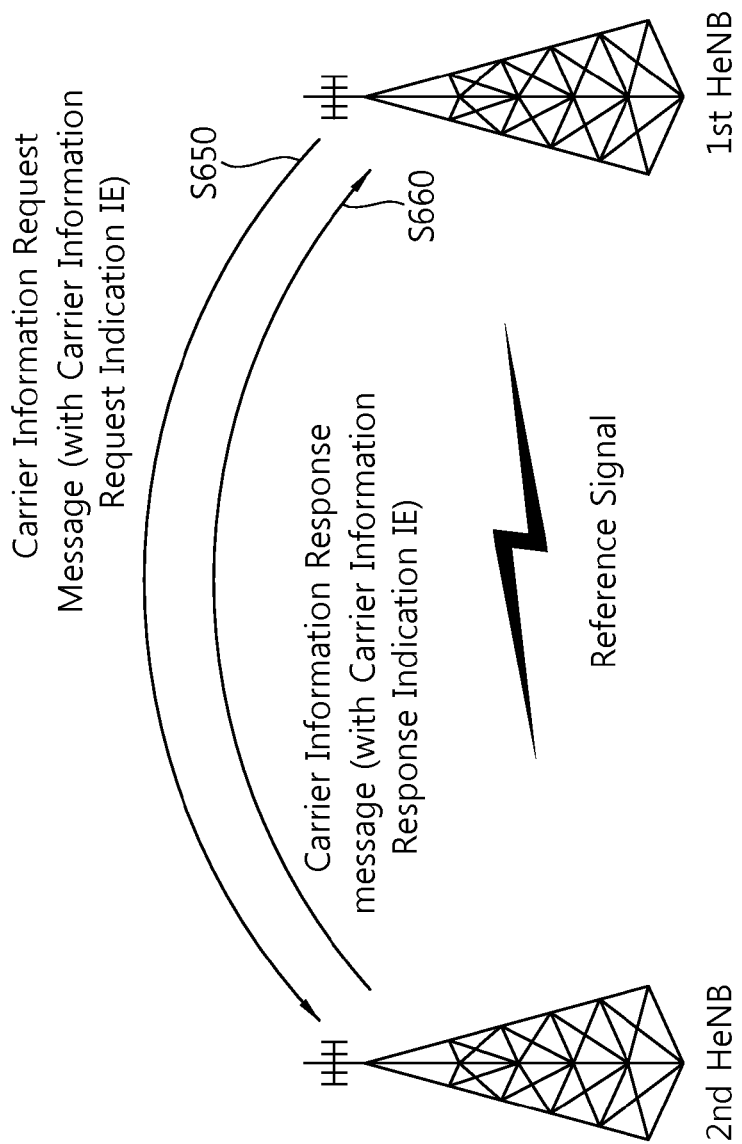
FIG. 17 shows another example of proposed method of selecting a carrier in a HetNet according to an embodiment of the present invention.

FIG. 17 shows another example of proposed method of selecting a carrier in a HetNet according to an embodiment of the present invention. This case is also for the scenario where the HeNBs with different CSG IDs can setup the direct X2 interface between them. This example may be performed after the direct X2 interface is setup between the HeNBs. Referring to FIG. 17, the first HeNB obtains the information required for carrier selection via the carrier information exchange procedure directly between the HeNBs.

At step S650, the first HeNB transmits a carrier information request message to the second HeNB. At step S660, the second HeNB transmits a carrier information response message to the first HeNB as a response of the carrier information request message. The detail operation of step S650 to step S650 may be the same as step S350 to step S360 of FIG. 11 respectively.

Figure 18:
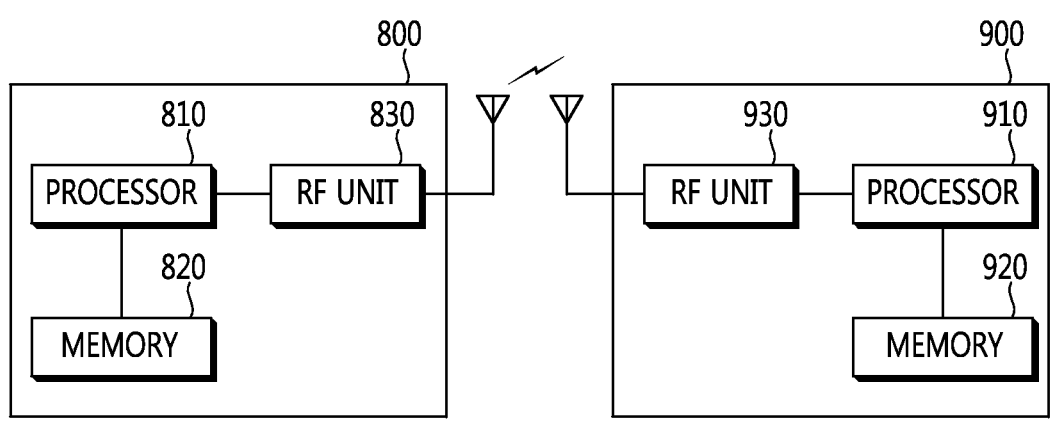
FIG. 18 is a block diagram showing wireless communication system to implement an embodiment of the present invention.

FIG. 18 is a block diagram showing wireless communication system to implement an embodiment of the present invention.

A pico eNB or HeNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A HeNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for selecting, by a home eNodeB (HeNB), a carrier in a wireless communication system, the method comprising:
   transmitting a carrier information request message including a request of information on carriers used by a pico eNB;
   receiving a carrier information response message as a response of the carrier information request message, the carrier information response message including first information on carriers used by the pico eNB and second information on carriers indicating information on user equipments (UEs) corresponding to the carriers used by the pico eNB; and
   selecting a primary cell (PCell) of the HeNB based on the received information on carriers used by the pico eNB,
   wherein the first information includes information on a physical primary component carrier (CC) and a physical secondary CC of the pico eNB,
   wherein the second information includes information on a first UE group including a plurality of UEs using the physical primary CC as a logical primary CC or using the physical secondary CC as the logical primary CC, and
   wherein the second information further includes information on a second UE group including a plurality of UEs using the physical primary CC as a logical secondary CC or using the physical secondary CC as the logical secondary CC.

2. The method of claim 1, wherein the information on the first UE group indicates one of density levels including primary high density, primary medium density, and primary low density.

3. The method of claim 1, wherein the information on the second UE group indicates one of density levels including secondary high density, secondary medium density, and secondary low density.

4. The method of claim 1, wherein the carrier information response message further includes third information on resource usage status of the logical primary CC and the logical secondary CC.

5. The method of claim 1, wherein the carrier information request message includes cell identity (ID) related information of the HeNB.

6. The method of claim 1, wherein the carrier information response message includes cell ID related information of the pico eNB.

7. The method of claim 1, wherein:
   the carrier information request message is transmitted to the pico eNB through a X2 interface; and
   the carrier information response message is received from the pico eNB through the X2 interface.

8. The method of claim 1, wherein:
   the carrier information request message is transmitted through a HeNB gateway (GW); and
   the carrier information response message is received through the HeNB GW.

9. The method of claim 7, wherein the carrier information request message or the carrier information response message is included in one of a resource status request message, resource status response message, resource status update message, and load information.

10. The method of claim 1, wherein:
    the carrier information request message is transmitted to the pico eNB directly during a X2 setup procedure; and
    the carrier information response message is received from the pico eNB directly during the X2 setup procedure.

11. The method of claim 10, wherein:
the carrier information request message is included in an X2 setup request message; and
the carrier information response message is included in an X2 setup response message which is a response of the X2 setup request message.

12. The method of claim 11, wherein:
the X2 setup request message is transmitted through a HeNB GW; and
the X2 setup response message is received through the HeNB.

13. The method of claim 1, wherein:
the carrier information request message is transmitted to a mobility management entity (MME) through an S1 interface; and
the carrier information response message is received from the MME through the S1 interface.

14. The method of claim 1, wherein:
the carrier information request message is transmitted to a mobility management entity (MME) during an S1 setup procedure; and
the carrier information response message is received from the MME during the S1 setup procedure.

15. The method of claim 1, wherein:
the pico eNB traces how many UEs are served by the physical primary CC, either as the logical primary CC or as the logical secondary CC, to determine the first UE group; and
the pico eNB traces how many UEs are served by its physical secondary CC, either as the logical primary CC or as the logical secondary CC, to determine the second UE group.

16. A method for selecting, by a first home eNodeB (HeNB), a carrier in a wireless communication system, the method comprising:
transmitting a carrier information request message including a request of information on carriers used by a second HeNB;
receiving a carrier information response message as a response of the carrier information request message, the carrier information response message including first information on carriers used by the second HeNB and second information on carriers indicating information on user equipments (UEs) corresponding to the carriers used by the second HeNB; and
selecting a primary cell (PCell) of the first HeNB based on the received information on carriers used by the second HeNB,
wherein the first information includes information on a physical primary component carrier (CC) and a physical secondary CC used by the second HeNB,
wherein the second information includes information on a first UE group including a plurality of UEs using the physical primary CC as a logical primary CC or using the physical secondary CC as the logical primary CC, and
wherein the second information further includes information on a second UE group including a plurality of UEs using the physical primary CC as a logical secondary CC or using the physical secondary CC as the logical secondary CC.

17. The method of claim 16, wherein:
the second HeNB traces how many UEs are served by the physical primary CC, either as the logical primary CC or as the logical secondary CC, to determine the first UE group; and
the second HeNB traces how many UEs are served by its physical secondary CC, either as the logical primary CC or as the logical secondary CC, to determine the second UE group.

* * * * *